US010834054B2

(12) United States Patent
Subbarayan et al.

(10) Patent No.: US 10,834,054 B2
(45) Date of Patent: Nov. 10, 2020

(54) SYSTEMS AND METHODS FOR API ROUTING AND SECURITY

(71) Applicant: Ping Identity Corporation, Denver, CO (US)

(72) Inventors: Udayakumar Subbarayan, Bangalore (IN); Bernard Harguindeguy, Atherton, CA (US); Anoop Krishnan Gopalakrishnan, Bangalore (IN); Abdu Raheem Poonthiruthi, Bangalore (IN)

(73) Assignee: Ping Identity Corporation, Denver, CO (US)

( * ) Notice: Subject to any disclaimer, the term of this patent is extended or adjusted under 35 U.S.C. 154(b) by 723 days.

(21) Appl. No.: 15/164,555

(22) Filed: May 25, 2016

(65) Prior Publication Data
US 2016/0352867 A1    Dec. 1, 2016

Related U.S. Application Data

(60) Provisional application No. 62/167,165, filed on May 27, 2015.

(51) Int. Cl.
*H04L 29/06* (2006.01)
*H04L 12/24* (2006.01)
(Continued)

(52) U.S. Cl.
CPC .......... *H04L 63/0281* (2013.01); *G06F 9/546* (2013.01); *H04L 41/0813* (2013.01);
(Continued)

(58) Field of Classification Search
CPC . G06F 9/546; H04L 41/0813; H04L 41/0893; H04L 41/12; H04L 41/28;
(Continued)

(56) References Cited

U.S. PATENT DOCUMENTS 6,336,117 B1   1/2002   Massarani
7,209,962 B2   4/2007   Boden
(Continued)

FOREIGN PATENT DOCUMENTS

| EP | 2715540 A1 | 4/2014 |
|---|---|---|
| WO | WO 2012/162102 | 11/2012 |
| WO | WO 2016/168368 | 10/2016 |

OTHER PUBLICATIONS

Office Action for U.S. Appl. No. 15/164,512, dated Jul. 6, 2018, 9 pages.
(Continued)

*Primary Examiner* — Gil H. Lee

(57) ABSTRACT

The invention provides methods, computer program products, proxies and proxy clusters configured for forwarding, routing and/or load balancing of client requests or messages between multiple different APIs and/or multiple instances of an API. The invention further provides for efficient session information based routing of client requests for a target API, wherein multiple instances of the target API are simultaneously implemented across one or more API servers. The invention additionally enables separation of a control plane (i.e. control logic) and run time execution logic within a data plane within proxies in a proxy cluster, and also enables implementation of a plurality of data planes within each proxy—thereby ensuring security, high availability and scalability. An invention embodiment additionally implements two-stage rate limiting protection for API servers combining rate limiting between client and each proxy, and rate limiting between a proxy cluster and a server backend.

22 Claims, 10 Drawing Sheets

(51) Int. Cl.
　　*H04L 29/08* (2006.01)
　　*H04L 12/715* (2013.01)
　　*H04L 12/771* (2013.01)
　　*H04L 12/775* (2013.01)
　　*H04L 29/14* (2006.01)
　　*H04L 12/741* (2013.01)
　　*H04L 12/803* (2013.01)
　　*H04L 12/813* (2013.01)
　　*G06F 9/54* (2006.01)

(52) U.S. Cl.
　　CPC .......... *H04L 41/0893* (2013.01); *H04L 41/12* (2013.01); *H04L 41/28* (2013.01); *H04L 41/50* (2013.01); *H04L 45/46* (2013.01); *H04L 45/56* (2013.01); *H04L 45/58* (2013.01); *H04L 45/74* (2013.01); *H04L 47/125* (2013.01); *H04L 47/20* (2013.01); *H04L 63/08* (2013.01); *H04L 63/166* (2013.01); *H04L 67/02* (2013.01); *H04L 67/10* (2013.01); *H04L 67/1068* (2013.01); *H04L 67/1095* (2013.01); *H04L 67/12* (2013.01); *H04L 67/145* (2013.01); *H04L 67/28* (2013.01); *H04L 67/32* (2013.01); *H04L 67/42* (2013.01); *H04L 69/16* (2013.01); *H04L 69/329* (2013.01); *H04L 69/40* (2013.01)

(58) Field of Classification Search
　　CPC ......... H04L 41/50; H04L 45/46; H04L 45/56; H04L 45/58; H04L 45/74; H04L 47/125; H04L 47/20; H04L 63/0281; H04L 63/08; H04L 63/166; H04L 67/02; H04L 67/10; H04L 67/1068; H04L 67/1095; H04L 67/12; H04L 67/145; H04L 67/28; H04L 67/32; H04L 67/42; H04L 69/16; H04L 69/329; H04L 69/40
　　See application file for complete search history.

(56) References Cited

U.S. PATENT DOCUMENTS

| | | | |
|---|---|---|---|
| 7,743,089 B2 | 6/2010 | Putzolu | |
| 8,339,959 B1 | 12/2012 | Moisand et al. | |
| 8,892,665 B1 | 11/2014 | Rostami-Hesarsorkh et al. | |
| 8,949,828 B2 | 2/2015 | Pafumi et al. | |
| 8,973,088 B1 | 3/2015 | Leung et al. | |
| 8,990,942 B2 | 3/2015 | Thakadu et al. | |
| 9,305,328 B2 | 4/2016 | Mahajan et al. | |
| 9,307,017 B2 | 4/2016 | Wang et al. | |
| 9,413,560 B2 | 8/2016 | Patil et al. | |
| 9,516,053 B1 | 12/2016 | Muddu et al. | |
| 9,537,756 B2 | 1/2017 | Bahadur et al. | |
| 9,948,703 B2 | 4/2018 | Olivier et al. | |
| 10,025,873 B2 | 7/2018 | Jackson et al. | |
| 10,038,742 B2 | 7/2018 | Reddy et al. | |
| 10,193,867 B2 | 1/2019 | Subbarayan et al. | |
| 10,484,337 B2 | 11/2019 | Subbarayan et al. | |
| 10,587,580 B2 | 3/2020 | Subbarayan et al. | |
| 10,666,621 B2 | 5/2020 | Subbarayan et al. | |
| 10,681,012 B2 | 6/2020 | Subbarayan et al. | |
| 10,699,010 B2 | 6/2020 | Subbarayan et al. | |
| 10,701,037 B2 | 6/2020 | Subbarayan et al. | |
| 2001/0039586 A1* | 11/2001 | Primak ............... H04L 67/1008 709/228 |
| 2002/0112189 A1 | 8/2002 | Syvanne et al. | |
| 2003/0110172 A1* | 6/2003 | Selman ............ G06F 17/30581 |
| 2005/0165902 A1* | 7/2005 | Hellenthal ............. H04L 29/06 709/217 |
| 2006/0159082 A1 | 7/2006 | Cook et al. | |
| 2006/0184661 A1 | 8/2006 | Weisman et al. | |
| 2007/0165622 A1 | 7/2007 | O'Rourke et al. | |
| 2007/0192506 A1 | 8/2007 | Gupta et al. | |
| 2008/0016339 A1 | 1/2008 | Shukla | |
| 2008/0263654 A1 | 10/2008 | Bahl et al. | |
| 2008/0320582 A1 | 12/2008 | Chen et al. | |
| 2009/0040926 A1 | 2/2009 | Li et al. | |
| 2009/0067440 A1 | 3/2009 | Chadda et al. | |
| 2009/0327459 A1 | 12/2009 | Yoo et al. | |
| 2010/0333111 A1 | 12/2010 | Kothamasu et al. | |
| 2011/0145842 A1 | 6/2011 | Tofighbakhsh et al. | |
| 2012/0054131 A1 | 3/2012 | Williamson | |
| 2012/0110603 A1* | 5/2012 | Kaneko ............... H04L 63/08 719/328 |
| 2012/0226820 A1 | 9/2012 | Li et al. | |
| 2012/0233668 A1 | 9/2012 | Leafe et al. | |
| 2012/0290511 A1 | 11/2012 | Frank et al. | |
| 2012/0304244 A1 | 11/2012 | Xie et al. | |
| 2013/0044764 A1 | 2/2013 | Casado et al. | |
| 2013/0205028 A1 | 8/2013 | Crockett et al. | |
| 2014/0012966 A1 | 1/2014 | Baphna et al. | |
| 2014/0059226 A1 | 2/2014 | Messerli et al. | |
| 2014/0237594 A1* | 8/2014 | Thakadu ............... G06F 21/52 726/23 |
| 2014/0258771 A1 | 9/2014 | Xie et al. | |
| 2014/0337268 A1* | 11/2014 | Bhattacharya .......... G06F 21/00 706/46 |
| 2014/0362681 A1 | 12/2014 | Bahadur et al. | |
| 2015/0026794 A1 | 1/2015 | Zuk et al. | |
| 2015/0095887 A1 | 4/2015 | Bhattacharya | |
| 2015/0161390 A1 | 6/2015 | Xuan | |
| 2015/0188760 A1 | 7/2015 | Anumala et al. | |
| 2015/0188808 A1 | 7/2015 | Ghanwani et al. | |
| 2015/0229579 A1* | 8/2015 | Kosim-Satyaputra ....... H04L 67/42 709/225 |
| 2015/0234639 A1 | 8/2015 | Allsbrook | |
| 2015/0319226 A1 | 11/2015 | Mahmood | |
| 2016/0011732 A1 | 1/2016 | Yang | |
| 2016/0057173 A1 | 2/2016 | Singman et al. | |
| 2016/0065672 A1 | 3/2016 | Savage et al. | |
| 2016/0092297 A1* | 3/2016 | Mazon ................. H04L 67/28 714/15 |
| 2016/0098265 A1 | 4/2016 | Mahajan et al. | |
| 2016/0234168 A1 | 8/2016 | Leung et al. | |
| 2016/0308721 A1 | 10/2016 | Dellisanti et al. | |
| 2016/0308900 A1 | 10/2016 | Sadika et al. | |
| 2016/0352588 A1 | 12/2016 | Subbarayan et al. | |
| 2016/0366155 A1 | 12/2016 | El-Moussa et al. | |
| 2017/0012941 A1 | 1/2017 | Subbarayan et al. | |
| 2017/0310708 A1 | 10/2017 | Schiappa et al. | |
| 2018/0115523 A1 | 4/2018 | Subbarayan et al. | |
| 2018/0115578 A1 | 4/2018 | Subbarayan et al. | |
| 2018/0278635 A1 | 9/2018 | Shin | |
| 2018/0337891 A1 | 11/2018 | Subbarayan et al. | |
| 2018/0337892 A1 | 11/2018 | Subbarayan et al. | |
| 2018/0337893 A1 | 11/2018 | Subbarayan et al. | |
| 2018/0337894 A1 | 11/2018 | Subbarayan et al. | |
| 2019/0114417 A1 | 4/2019 | Subbarayan et al. | |
| 2020/0162433 A1 | 5/2020 | Subbarayan et al. | |
| 2020/0177556 A1 | 6/2020 | Subbarayan et al. | |

OTHER PUBLICATIONS

Office Action for U.S. Appl. No. 15/164,512, dated Feb. 28, 2019, 18 pages.

Office Action for U.S. Appl. No. 15/164,587, dated Feb. 22, 2018, 17 pages.

Office Action for U.S. Appl. No. 16/050,958, dated Dec. 31, 2018, 7 pages.

Office Action for U.S. Appl. No. 16/050,996, dated Nov. 16, 2018, 6 pages.

Office Action for U.S. Appl. No. 16/051,026, dated Dec. 13, 2018, 6 pages.

Extended European Search Report for European Application No. 18200235.2, dated Feb. 11, 2019, 9 pages.

Ghaffarian, S. M. et al., "Software vulnerability analysis and discovery using machine-learning and data-mining techniques: A Survey," ACM Computing Surveys, vol. 50, No. 4, Article 56, pp. 1-36 (Aug. 2017).

(56) References Cited

OTHER PUBLICATIONS

Office Action for U.S. Appl. No. 15/164,512, dated Aug. 15, 2019, 16 pages.
Office Action for U.S. Appl. No. 16/050,915, dated Sep. 6, 2019, 18 pages.
Office Action for U.S. Appl. No. 15/792,850, dated Aug. 8, 2019, 9 pages.
Office Action for U.S. Appl. No. 15/793,671, dated Jul. 8, 2019, 36 pages.
Office Action for European Application No. 18200235.2, dated Jan. 30, 2020, 7 pages.
Office Action for U.S. Appl. No. 16/158,836, dated Nov. 18, 2019, 13 pages.
Hachinyan, O., "Detection of Malicious Software Based on Multiple Equations of API-call Sequences," Feb. 2017, IEEE, pp. 415-418.
Extended European Search Report for European Application No. 20150237.4, dated May 27, 2020, 13 pages.

\* cited by examiner

SYSTEMS AND METHODS FOR API ROUTING AND SECURITY

CROSS-REFERENCE TO RELATED APPLICATION

This application claims priority to U.S. Provisional Patent Application No. 62/167,165, filed May 27, 2015, the contents of which are incorporated by reference herein.

FIELD OF THE INVENTION

The present invention relates to the domain of API routing and security. In particular, the invention provides systems and methods for API routing and security based on application layer data, including for forwarding, routing and/or load balancing among API servers.

BACKGROUND

API based web applications, distributed applications and client server applications may use one or more proxy nodes (including servers, virtual machines and linux containers) interposed between clients and servers for routing, load balancing and enforcing security at the API layer. Proxy nodes of the above type distribute incoming client requests or messages among multiple servers to ensure one or more of targeted routing, balanced server utilization, minimized server overloads, and high availability.

Proxies of router or load balancer type receive client requests or messages, select an appropriate server(s) for processing the requests or messages and transmit the requests or messages to the selected server(s).

FIG. 1 illustrates a network architecture 100 comprising a routing or load balancing proxy 104 disposed as a network intermediate between clients 102 (i.e. clients 102a, 102b and 102c) and servers 106 (106a, 106b and 106c).

Based on information retrieved from a DNS server or other name server, requests or messages from client 102 for services from server backend 106 are directed to proxy 104. Proxy 104 transmits the received requests or messages to an appropriate server (106a to 106c) within server backend 106. Depending on the configuration of proxy 104, responses from servers 106a to 106c may first be received at proxy 104 and thereafter redirected to requesting client 102.

In routing and load balancing, a proxy receives data packets addressed to a target service or server. The proxy routes the data packets to an appropriate server based on predefined routing or load balancing policies and techniques. In prior art routing and load balancing proxies, routing decisions rely on information associated with Layers 2 to 4 of the Open System Interconnection ("OSI") model, or Transmission Control Protocol/Internet Protocol ("TCP/IP").

FIG. 2 illustrates protocol layers of the OSI model 200 and the corresponding TCP/IP model. In the OSI model, each network device modularly implements the various OSI layers. Beginning with Layer 7 and progressing downward, each layer communicates with the layer immediately below and immediately above. As devices move to lower layers, the information is increasingly packaged for the specific hardware associated with the device/network—concluding in Layer 1, which is the physical communication channel. Under TCP/IP, Layers 1 to 2 are implemented as a subnet (or MAC) stack, Layer 3 as the Internet (or IP) stack, Layer 4 as the transport (or TCP/UDP) stack, and Layers 5 to 7 as the Application stack. Data generated by a first network device is processed down the protocol stacks, from Layer 7 to Layer 1, into a packet, with each stack adding a header to the packet. The packet is then transmitted over a physical channel to a second network device, which processes the packet up the stacks starting from Layer 1, and unwraps the respective headers after terminating them at their associated stacks. At Layer 7, the application data of the first device is retrieved for interaction with the application of the second device.

FIG. 3 illustrates various headers of an IP packet 300. Each IP packet consists of a data portion for carrying a data payload and a header portion for carrying overhead information. The header portion is partitioned into layer or protocol dependent headers. By way of example, a Layer 2 or MAC header includes a destination MAC address and a source MAC address that specify the destination and source hardware addresses of a node within a subnet. A Layer 3 or IP header includes a source IP address and a destination IP address that respectively specify the IP addresses of the source and destination nodes on the Internet. A Layer 4 or TCP header includes a source TCP port and a destination TCP port that respectively specify the port numbers used by the source node and the destination node.

The payload/data portion of the IP packet contains Layer 7 information which includes data generated by the application. This data may include HTTP headers—which is regarded as application data and is therefore located in the payload portion of the IP packet. The HTTP header may comprise a URL field for specifying a URL that the data packet is requesting, and may also include a cookie field for the application to communicate environmental information.

Prior art solutions for routing or load balancing proxies typically use Layer 7 header information to simply route a client message or request to a target server, whereinafter identification of a target API and communicating the message to the target API is achieved by the target server. Additionally, prior art proxies for load balancing have till now been limited to implementing solutions for client messages over a single communication protocol (in Layer 7) only, and in particular limited to load balancing and routing for client requests and messages seeking HTML content over the HTTP protocol.

It has been found that in the case of application programming interface (API) servers, in view of a large number of real time requests for API services, multiple instances of an API may be running on multiple servers within a server backend. These multiple servers may span multiple racks, datacenters or networks. Equally, a single server may be used for parallel execution of multiple instances of a single API.

Since prior art routing solutions are limited to delivering client requests or messages to a destination server capable of servicing the client request or message, and thereafter relying on internal routing or load balancing logic within the destination server for load balancing between multiple instances of an API. Additionally no solutions are presently available which enable efficient routing or load balancing among API servers.

There is accordingly, a need for API routing solutions which utilize higher layer protocol information within data packets to achieve targeted forwarding routing, balanced server utilization, minimized server overloads, and improved high availability of API servers.

SUMMARY

The invention provides systems and methods for API routing and security based on application layer data, including for forwarding, routing and/or load balancing among API servers.

In an embodiment, the invention provides a proxy configured for routing client messages to a target API. The proxy comprises (i) a processor, (ii) a routing controller configured to (a) extract from data packets corresponding to a received client message, an API name and hostname corresponding to the target API, (b) select from among a set of API characteristics data definitions, an API characteristics data definition that includes the extracted API name and hostname, (c) identify from within the selected API characteristics data definition at least one of (1) an IP address of a target API server hosting an instance of the target API and (2) a TCP port associated with said instance of the target API, and (d) transmit the received client message to the target API based on information identified from within the selected API characteristics data definition.

In an embodiment, transmission of the received client message is reliant on prior authentication of the client message, said authentication comprising (i) comparing message parameter information extracted from the received client message against parameter information requirements specified within the selected API characteristics data definition, and (ii) ascertaining that the message parameter information extracted from the received client message complies with the parameter information requirements specified within the selected API characteristics data definition.

The compared message parameter information may comprise one or more of cookie information, token information, communication protocols, protocol methods and content type. The proxy may be configured to select an IP address and a TCP port, from among a plurality of IP addresses and TCP ports specified within the selected API characteristics data definition.

Transmission of the received client message to the target API may in an embodiment be based at least on the selected IP address and TCP port. Transmission of the received client message to the target API may be based on at least one predefined routing or load balancing policy.

The proxy may be configured to implement (i) a control plane comprising a processor implemented control process, and (ii) one or more data planes, each data plane comprising a discrete processor implemented balancer process.

The control plane may be configured for one or more of (i) receiving a new API characteristics data definition, (ii) validating a received new API characteristics data definition based on a prescribed API characteristics data definition schema and/or one or more validation rules, (iii) persisting validated API characteristics data definitions, (iv) synchronizing a plurality of proxies so that said plurality of proxies have access to validated and persisted API characteristics data definitions, (v) monitoring and synchronizing cookies and other session data at the proxy, (vi) monitoring the one or more data planes for a failure event.

At least one data plane may be configured for one or more of (i) comparing data parsed from data packets associated with a client message, with data in API characteristics data definitions, (ii) identifying an API characteristics data definition corresponding to a target API, (iii) implementing routing or load balancing decisions based on contents of an identified API characteristics data definition that corresponds to a target API, (iv) implementing authentication steps, implementing rate limiting based security for API servers, and (v) implementing load balancing decisions based on cookies or session data.

In an embodiment, the proxy may be configured to implement asynchronous message based inter process communication (IPC) between the control plane and each data plane. In another embodiment, at least one data plane may comprise an asynchronous data plane. In a further embodiment, the proxy may comprise a discrete data plane corresponding to each protocol or corresponding to each TCP port supported by the proxy. At least one data plane within the proxy may have a plurality of associated sub-processes.

The invention additionally provides a proxy cluster configured for routing client messages to a target API and comprising a plurality of proxies, wherein at least one of the plurality of proxies comprises (i) a processor, (ii) a routing controller configured to (a) extract from data packets corresponding to a received client message, an API name and hostname corresponding to the target API, (b) select from among a set of API characteristics data definitions, an API characteristics data definition that includes the extracted API name and hostname, (c) identify from within the selected API characteristics data definition at least one of (1) an IP address of a target API server hosting an instance of the target API and (2) a TCP port associated with said instance of the target API, and (d) transmit the received client message to the target API based on information identified from within the selected API characteristics data definition.

Each of the plurality of proxies is configured to ensure that a data state of the set of API characteristics data definitions accessible at said proxy is synchronized with data states of the set of API characteristics data definitions accessible at every other proxy within the proxy cluster.

The invention additionally provides a method for routing client messages received at a proxy to a target API among a plurality of APIs implemented on one or more API servers. The method comprises (i) extracting from data packets corresponding to a received client message, an API name and hostname corresponding to the target API, (ii) selecting from among a set of API characteristics data definitions, an API characteristics data definition that includes the extracted API name and hostname, (iii) identifying from within the selected API characteristics data definition at least one of (1) an IP address of a target API server hosting an instance of the target API and (2) a TCP port associated with said instance of the target API, and (iv) transmitting the received client message to the target API based on information identified from within the selected API characteristics data definition. Transmission of the received client message may in an embodiment be reliant on prior authentication of the client message, said authentication comprising (i) comparing message parameter information extracted from the received client message against parameter information requirements specified within the selected API characteristics data definition, and (ii) ascertaining that the message parameter information extracted from the received client message complies with the parameter information requirements specified within the selected API characteristics data definition.

In a method embodiment, the compared message parameter information may comprise one or more of cookie information, communication protocols, protocol methods and content type. The method may further comprise selecting an IP address and a TCP port, from among a plurality of IP addresses and TCP ports specified within the selected API characteristics data definition.

Transmission of the received client message to the target API may be based at least on the selected IP address and TCP port. Transmission of the received client message to the target API may be based on at least one predefined routing or load balancing policy.

In a method embodiment, the target API server hosting an instance of the target API may be identified based on a combination of transport protocol data and application protocol data, and wherein the received client message is routed to the identified target API server. The target API server may host an instance of the target API is identified based on TCP data extracted from the client message.

The invention additionally provides a method for routing client messages received at a proxy to an instance of a target API among a plurality of implemented instances of the target API, the method comprising (i) extracting from data packets corresponding to a received client message, an API name and hostname corresponding to the target API, (ii) selecting from among a set of API characteristics data definitions, an API characteristics data definition that includes the extracted API name and hostname, (iii) based on data within the selected API characteristics data definition, identifying a set of API servers, wherein each API server within the identified set of API servers implements an instance of the target API, and (iv) responsive to determining that the client message is a non-session based message, transmitting the received client message to an instance of the target API implemented on an API server selected from the identified set of API servers, such that among the identified set of API servers the selected API server has a lowest number of session users.

In an embodiment the method for routing client messages may additionally comprise responding to a determination that the client message is a session based message, by (i) ascertaining whether a client associated with the client message has been assigned to an API server implementing an instance of the target API, and (ii) responsive to determining that the client has not been assigned to an API server implementing an instance of the target API, transmitting the received client message to an instance of the target API implemented on an API server selected from the identified set of API servers, such that among the identified set of API servers the selected API server has a lowest number of session users.

The invention additionally provides computer program products for implementing one or more of the above methods, the computer program product comprising a non-transitory computer usable medium having a computer readable program code embodied therein, said computer readable program code comprising instructions for implementing said one or more methods.

BRIEF DESCRIPTION OF THE ACCOMPANYING DRAWINGS

DETAILED DESCRIPTION

The present invention provides proxies configured for routing and/or load balancing of client requests or messages between multiple different APIs (either running on a single server or distributed across multiple servers), as well as between multiple instances of an API (running on a single server or distributed across multiple servers). Additionally, the invention provides novel and inventive methods for handling various types of APIs such as Request/Response REST APIs, Streaming APIs that use Web Socket, and Publish/Subscribe APIs that use MQTT for text data or binary data such as array buffer or blob, with encryption (e.g. using SSL/TLS) or without encryption.

For the purposes of the present invention "API server" shall mean any server running at least one instance of at least one API.

For the purposes of the invention "client" shall mean any device having information processing and network communication capabilities. The types of clients may vary widely and include but are not limited to desktop computers, laptop computers or notebook computers, personal digital assistants, handheld computers, cellular phones, servers and Internet of Things (IOT) sensors, brokers, gateways, servers, or devices.

For the purposes of the present invention, "proxy" or "proxy node" shall mean any device having information processing and network communication capabilities that is configured to route communications from a client to a server and/or vice versa. The types of proxies may vary widely and include but are not limited to routers, load balancers, full proxies, half proxies, security proxies and IOT proxies.

For the purposes of the present invention, "proxy cluster" or "cluster of proxies" shall mean a plurality of proxies. For the purposes of the present invention, proxies within a proxy cluster may be understood as being interconnected in an overlay network.

For the purposes of the invention, "server" shall mean any device having information processing and network communication capabilities, and which is configured to provide one or more services to a requesting client, over a communication network. The types of servers may vary widely, and include but are not limited to API servers, application servers, web servers, microservices, FTP servers, IOT brokers or servers or gateways, message brokers, or service oriented architecture (SOA) servers.

For the purposes of the invention, "server backend" shall mean a set of one or more API servers.

Figure 1:
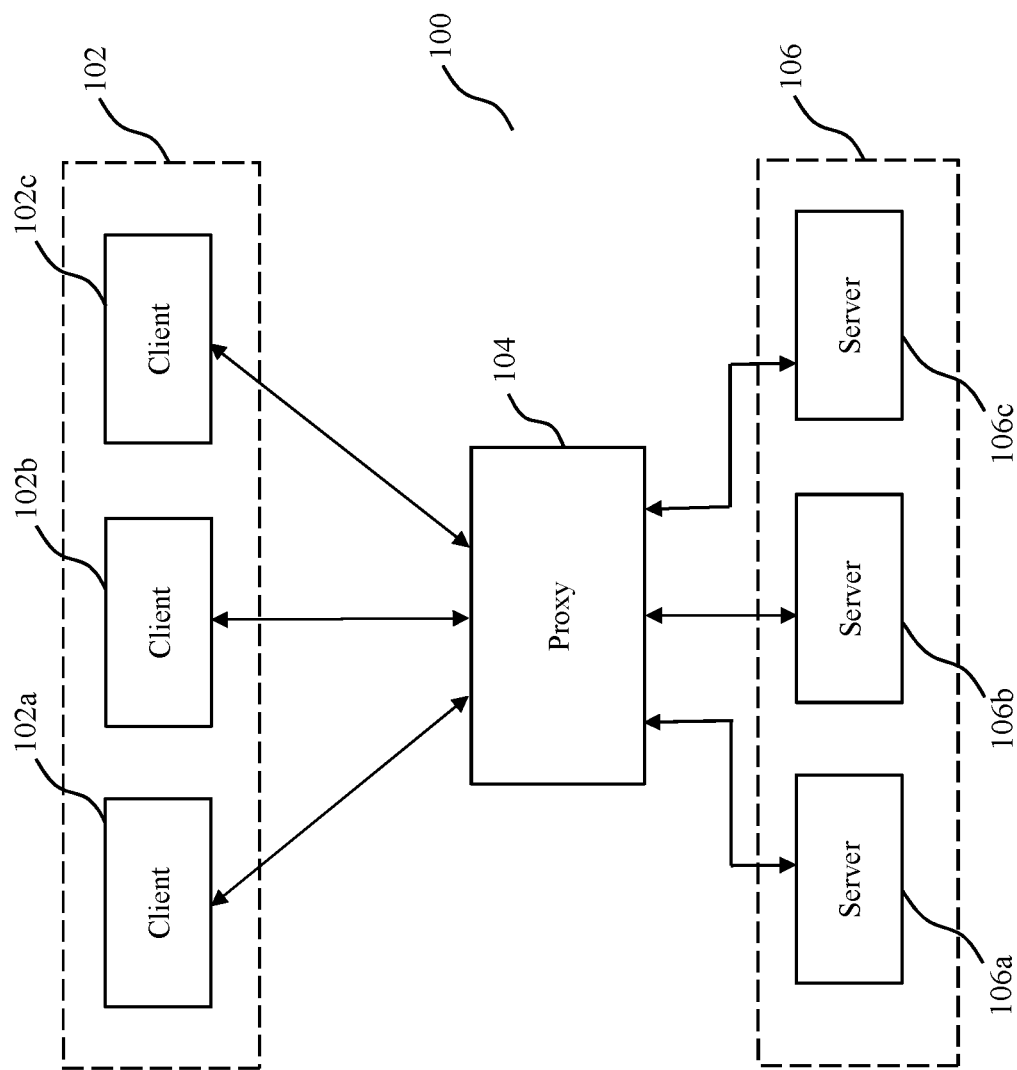
FIG. 1 illustrates a networking architecture comprising a forwarding, routing or load balancing proxy.
Figure 2:
FIG. 2 illustrates OSI protocol layers and corresponding TCP/IP layers.
Figure 3:
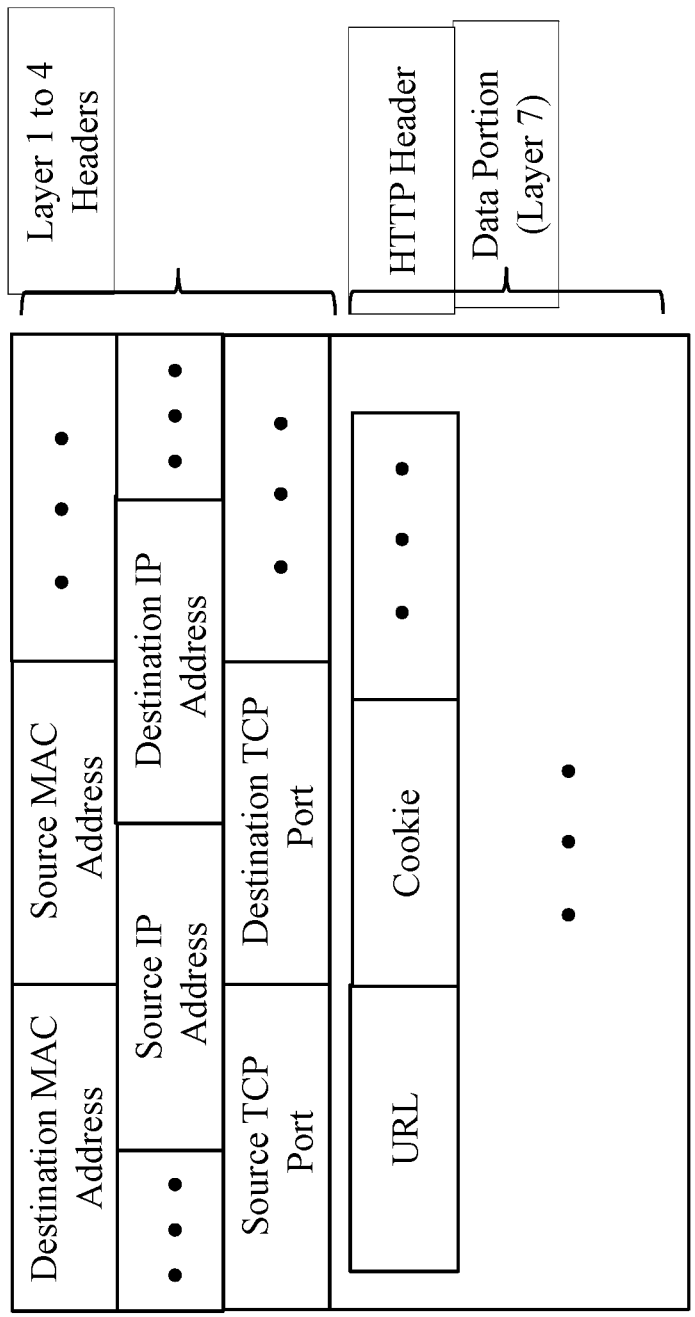
FIG. 3 illustrates headers of an IP packet.
Figure 4:
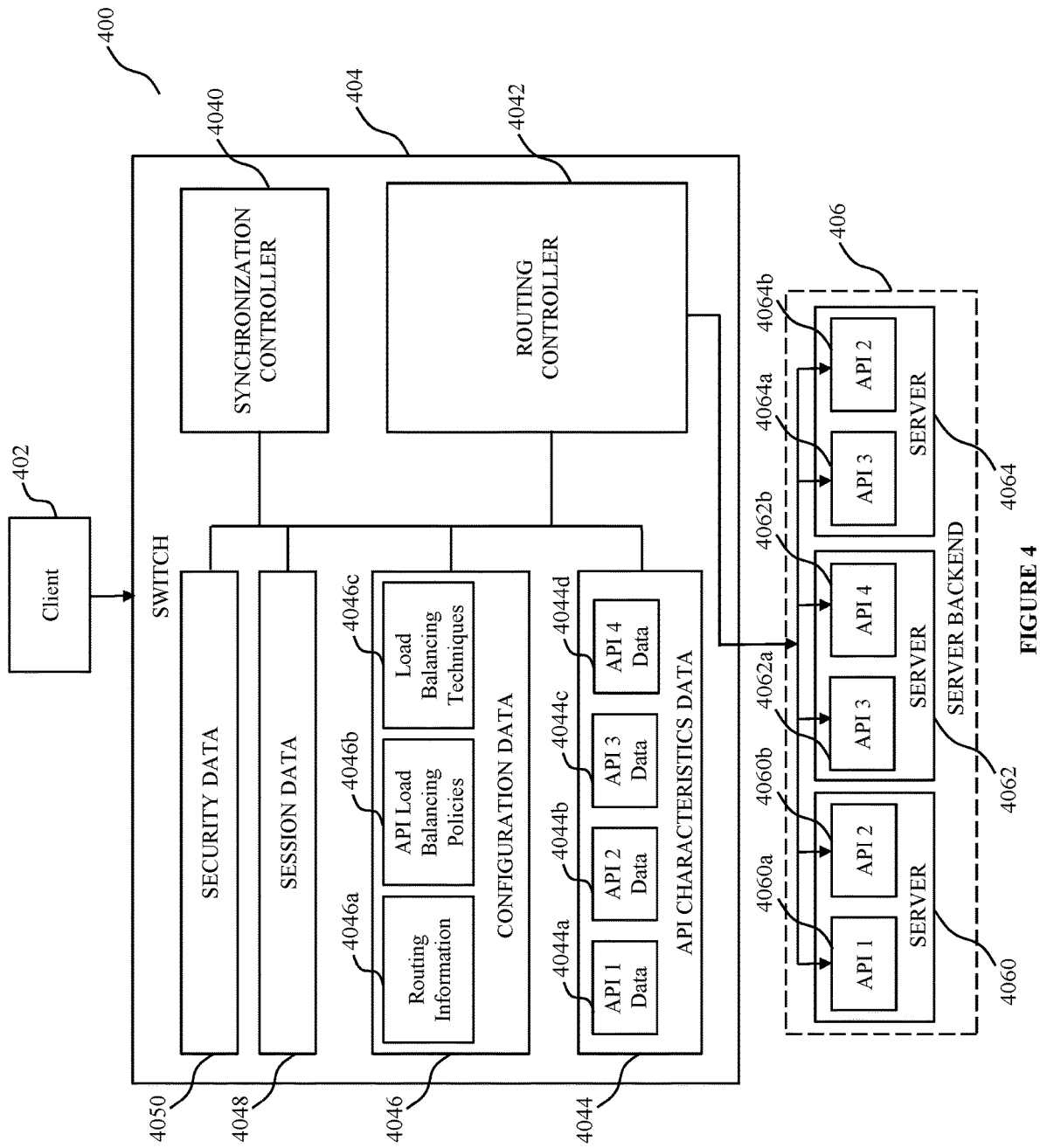
FIG. 4 illustrates a networking architecture comprising a proxy incorporating Layer 7 based forwarding, routing or load balancing in accordance with the present invention.

FIG. 4 illustrates a network architecture 400 having proxy 404 disposed as a network intermediate between client(s) 402 and server backend 406. Server backend 406 comprises servers 4060, 4062 and 4064. Server 4060 is illustrated as running instances of two APIs—namely, API 1 (4060a) and API 2 (4060b). Server 4062 is illustrated as running instances of two APIs—namely, API 3 (4062a) and API 4 (4062b). Server 4064 is illustrated as running instances of two APIs—namely, API 3 (4064a) and API 2 (4062b). It would be clear from FIG. 3 that server 4062 and server 4064 are each running a separate instance of API 3 (i.e. 4062a and 4064a) and that server 4060 and server 4064 are each running a separate instance of API 2 (i.e. 4060b and 4064b). It would also be understood that the distribution of two APIs per server is only illustrative and is not intended to be limiting.

Proxy 404 is an embodiment of a proxy configured for routing or load balancing among API servers. Proxy 404 comprises a routing controller 4042 and a synchronization controller 4040. Proxy 404 may additionally include or enable access to one or more repositories of data associated with proxy 404, said repositories of data comprising (i) API characteristics data 4044, (ii) configuration data 4046, (iii)

session data 4048, and (iv) security data 4050. One or more repositories comprising the above data may in various embodiment of the invention be accessible by one or both of routing controller 4042 and synchronization controller 4040.

API characteristics data 4044 comprises information identifying one or more characteristics of each API implemented within the server back end. In an embodiment of the invention illustrated in FIG. 4, API characteristics data 4044 includes a unique set of API characteristics data definitions (API 1 data (4044*a*), API 2 data (4044*b*), API 3 data (4044*c*) and API 4 data (4044*d*)) corresponding to each distinct API (i.e. to API 1 (4060*a*), API 2 (4060*b*, 4064*b*), API 3 (4062*a*, 4064*a*) and API 4 (4062*b*)) implemented within the server backend. In the illustration of FIG. 4, server backend implements 4 distinct APIs, namely API 1 (4060*a*), API 2 (4060*b* and 4064*b*), API 3 (4062*a* and 4064*a*), and API 4 (4062*b*). Each of APIs 1 to 4 accordingly has a corresponding unique API characteristics data definition within API characteristics data 4044, namely (i) API 1 has corresponding API characteristics data definition 4044*a*, (ii) API 2 has corresponding API characteristics data definition 4044*b*, (iii) API 3 has corresponding API characteristics data definition 4044*c*, and (iv) API 4 has corresponding API characteristics data definition 4044*d*.

Exemplary non-limiting API characteristics defined within each API characteristics data definition may include one or more of: (i) client side name associated with the API (i.e. external API name), (ii) server side name associated with the API (i.e. internal API name), (iii) hostname associated with the API, (iv) IP address of API server, (v) TCP port associated with the API on said API server, (vi) login URL or secure URL associated with the API, (vii) cookie information, (viii) communication protocols supported by the API (e.g. HTTP, WebSocket, MQTT, CoAP, etc.), (ix) HTTP methods or other protocol methods supported by the API (e.g. GET, POST, PUT, DELETE, HEAD, Request/Response APIs for HTTP, Streaming for WebSocket, Publish/Subscribe for MQTT etc.), and (x) content type supported by the API.

In an embodiment where multiple instances of an API are being implemented across multiple servers, or within a single server, an API characteristics data definition corresponding to such API may include the IP address of each API server that is being used to implement each instance of the API, as well as the TCP port associated with each instance of the API.

In an embodiment of the invention, each API characteristics data definition may comprise a data file uniquely associated with an API, or a set of data records uniquely associated with an API Configuration data 4046 comprises configuration information that proxy 404 requires to effect routing of incoming client requests or messages to an API server within the server backend. In an embodiment of the invention, configuration data 4046 may comprise one or more of (i) data port information and/or other routing information 4046*a* corresponding to one or more servers within a server backend, (ii) load balancing or routing policies 4046*b*, (iii) load balancing and/or routing techniques 4046*c*, (iv) management ports, (v) maximum number of processes or threads for each port, (vi) policies for generating logs (i.e. policies regarding what events or information to log, event triggers for logging and log persistence and/or management policies) and (vii) firewall settings corresponding to one or more servers within the server backend.

Session data 4048 comprises information identifying one or more characteristics of users or clients communicating through proxy 404. In an embodiment of the invention, session data 4048 comprises one or more of (i) cookies, (ii) tokens (e.g. standard tokens such as OAuth and SAML, or custom tokens), (iii) client ids and (iv) device ids. In a more specific embodiment of the invention, session data 4048 may be limited to information that is active (i.e. that has not expired) in accordance with session expiry policies of one or more API servers within the server backend 406.

Security data 4050 comprises Transport Layer Security/Secure Sockets Layer (TLS/SSL) security data corresponding to each session that is active (i.e. that has not expired) in accordance with applicable session expiry policies. In an embodiment of the invention, security data 4050 may comprise one or more of cipher suites, digital certificates (including one or more of server name, a trusted certificate authority (CA) and a backend server's public encryption key), session keys and/or asymmetric and symmetric ciphers that have been received at proxy 404.

In addition to the above, while not illustrated in FIG. 4, proxy 404 may additionally include information identifying all other live or active proxy nodes (i.e. proxy nodes other than proxy 404) within a cluster of proxies. In an embodiment of the invention, this information may include one or more of hardware identification information, IP address information and/or network routing information corresponding to such other live or active proxy nodes within the cluster of proxies.

Proxy 404 may also include a data packet parser (not shown in FIG. 4) configured to parse at least Layer 7 data from data packets corresponding to a received client request or message.

Proxy 404 includes routing controller 4042, which may be configured to (i) receive client requests or client messages, and (ii) respond to received requests or messages satisfying one or more predefined criteria, by transmitting said requests or messages onward to an appropriate API within one or more API server(s) within the server backend. Routing controller 4042 is a controller configured to implement routing or load balancing of client requests or messages received at a proxy node—to ensure that legitimate client requests or messages are transmitted onwards to an API server configured to implement an API identified in the client request or message.

Figure 7:
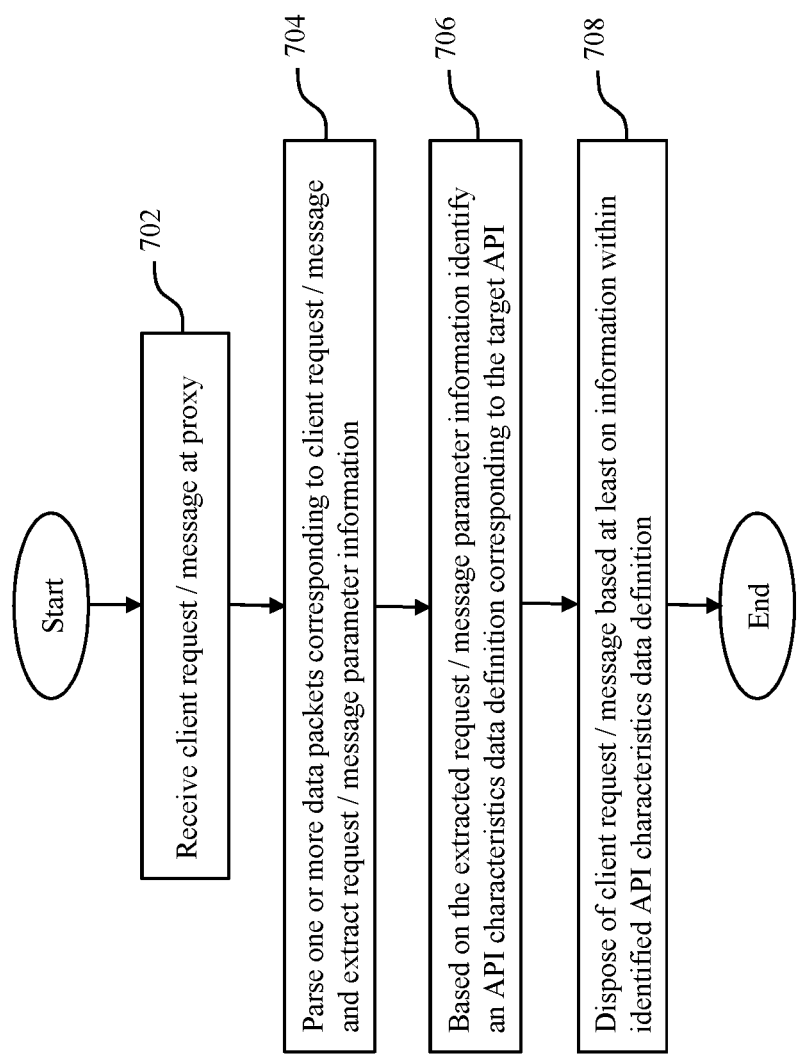
FIGS. 7, 8A and 8B illustrate methods of Layer 7 based routing in accordance with the present invention.

FIG. 7 (discussed in detail hereinafter) illustrates methods of routing employed by proxy 404 in forwarding, routing or load balancing client requests to a target API within an API server.

In embodiments of the invention where the network architecture comprises a cluster of proxies, proxy 404 may additionally comprise processor based synchronization controller 4040 that is configured to respond to a predefined synchronization event or synchronization trigger by synchronizing one or more of (i) a data state of one or more of API characteristics data 4044, configuration data 4046, session data 4048, security data 4050 and information identifying other live or active proxy nodes, with (ii) a data state of corresponding API characteristics data, configuration data, session data, security data and/or information identifying other live or active proxy nodes, associated with another proxy node within the proxy cluster. In an embodiment of the invention, synchronization controller 4040 is configured to synchronize data states more than one (and preferably all) of API characteristics data 4044, configuration data 4046, session data 4048, security data 4050, and information identifying other live or active proxy nodes, with (ii) data states of corresponding API characteristics data, configuration data, session data, security data, and information identifying other live or active proxy nodes within the proxy cluster. It would be understood that in an embodiment of the invention, synchronization of data states may involve synchronization of state changes that have occurred since a previous synchronization event.

Figure 5:
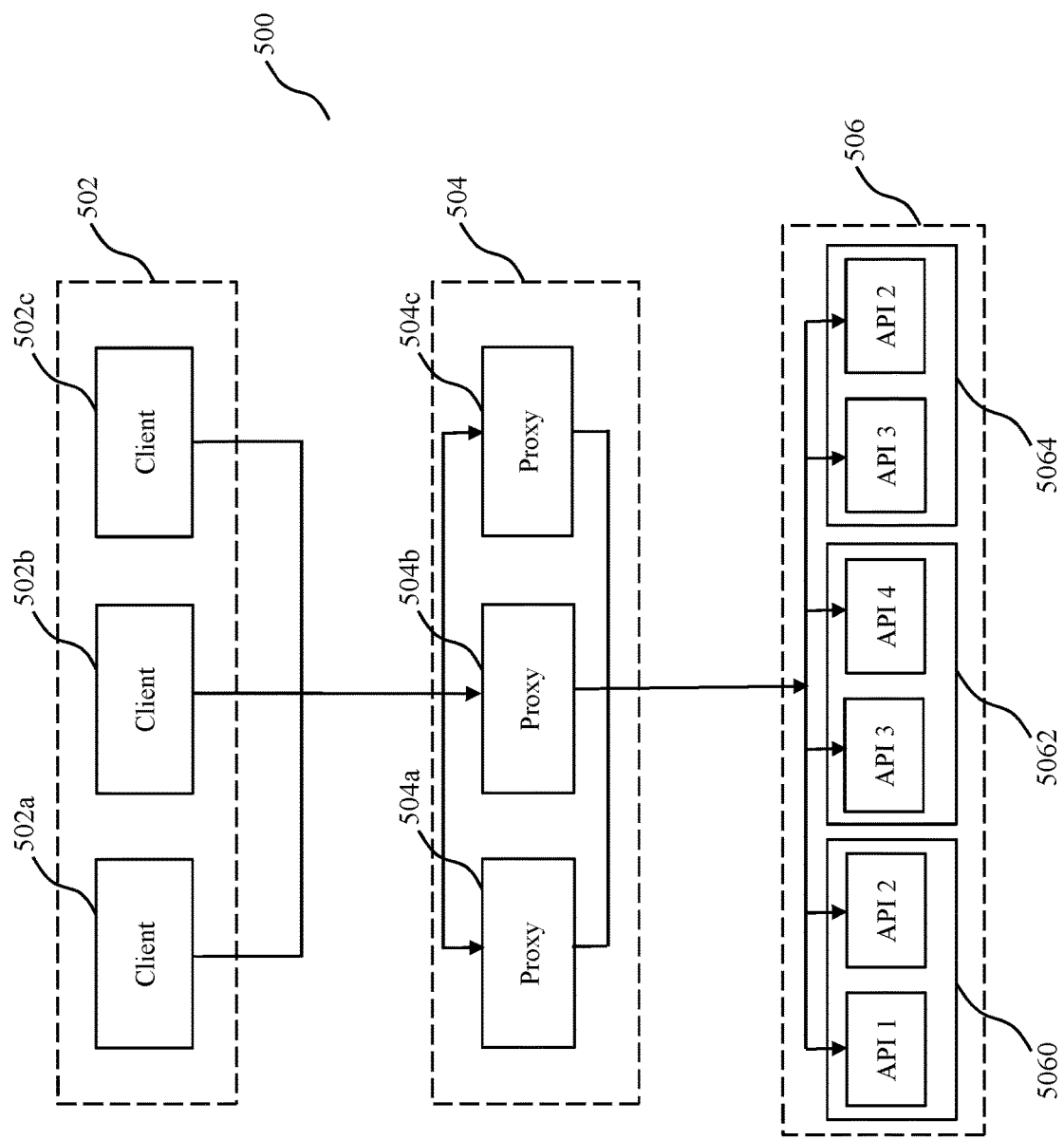
FIG. 5 illustrates a networking architecture comprising a scalable cluster of proxies.

FIG. 5 illustrates a network architecture, wherein proxy cluster 504 is disposed as a network intermediate between clients 502 (i.e. clients 502a, 502b and 502c) and API server backend 506 (i.e. API server 5060 (comprising API 1 and API 2); API server 5062 (comprising API 3 and API 4); and API servers 5064 (comprising API 3 and API 2)). Each client request or client message directed towards server backend 506, and each response from server backend 206 is routed through proxy cluster 504.

As illustrated in FIG. 5, proxy cluster 504 comprises a plurality of proxy nodes (i.e. proxies 504a, 504b and 504c). A client request or message for an API implemented on an API server within server backend 506 is routed to a proxy within switching cluster 504. Based on API characteristics data available to the specific proxy, the proxy may route the client request to an appropriate API implemented at an API server within server backend 206. Responses from an API server to the client request or message are likewise transmitted from the API server back to the specific proxy, and onward from the specific proxy to the client from which the request or message originated.

The decision to route a client request or message to a specific proxy within proxy cluster 504, may in an embodiment of the invention be based on routing logic or routing policies within a DNS server or other name server (not shown). Exemplary load balancing parameters that the routing policies of the DNS server may rely on for selecting a specific proxy within proxy cluster 504 may include one or more of: location of the requesting client, location of the target API server(s), present load balance among proxies within the proxy clusters, content and/or type of request etc.

Selection of a target API and target API server (within server backend 506) by a proxy within proxy cluster 504 may be determined in accordance with the method discussed in more detail subsequently in connection with FIG. 7. In a specific embodiment of the invention, a plurality of proxies within proxy cluster 504 (and preferably all proxies within proxy cluster 504) may be configured to use identical methods for selecting a target API server—thereby ensuring that a specific client request or message will undergo identical routing/onward transmission by a proxy within proxy cluster 504, regardless of which proxy (within the proxy cluster) the client request or message is received at.

Figure 6:
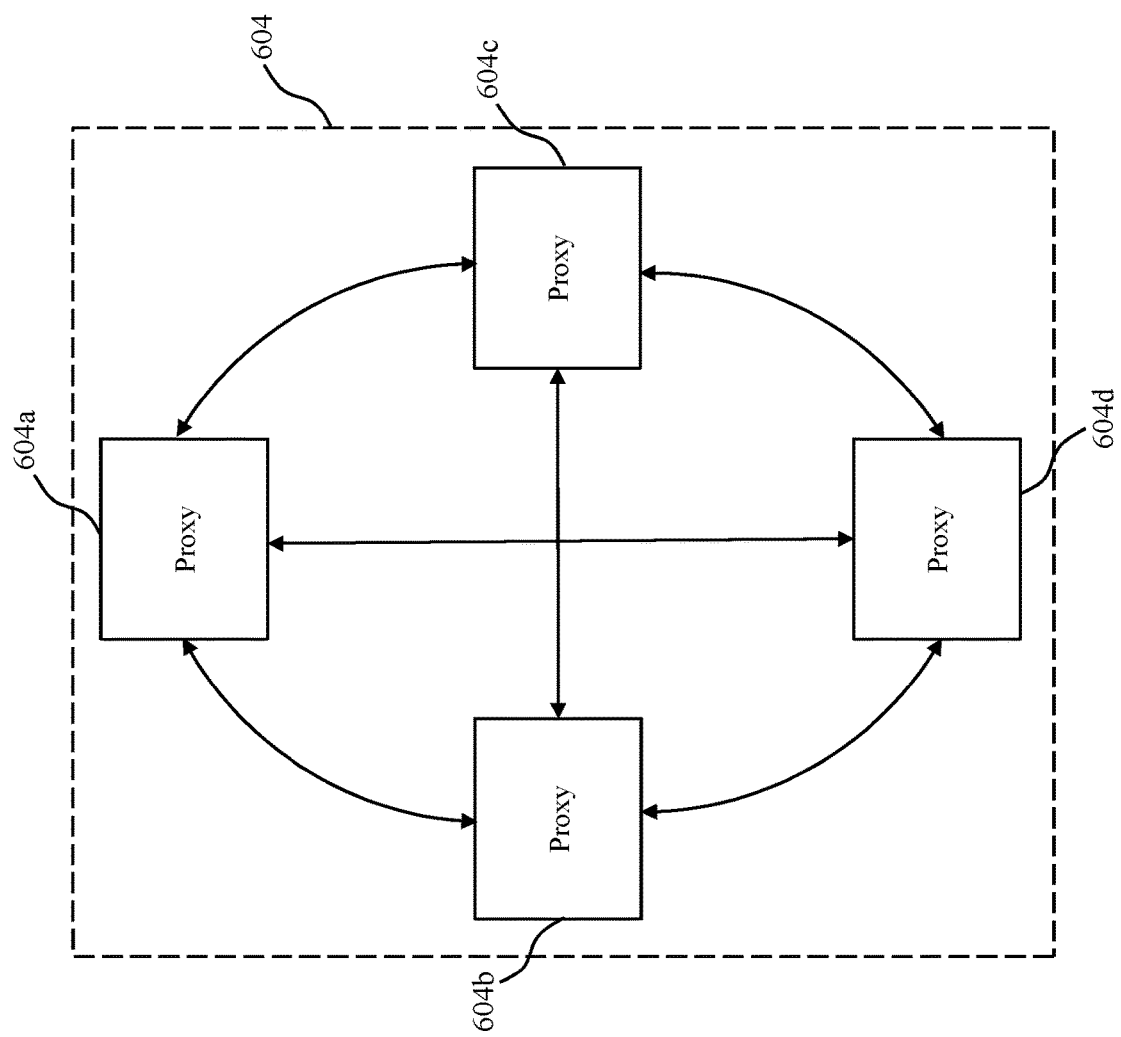
FIG. 6 illustrates a peer-to-peer network configuration of a cluster of proxies.

FIG. 6 illustrates an embodiment of the invention where proxy cluster 604 comprises four proxies 600a to 600d. It would be understood that the selection of a proxy cluster comprising four proxies is simply exemplary and that proxy cluster 604 may comprise any number of proxies. Each proxy 604a to 604d within proxy cluster 604 may comprise an instance of proxy 404 discussed previously in connection with FIG. 4. Accordingly, the synchronization process between proxies 604a to 604d may result in all proxies within proxy cluster 604 having identical data states corresponding to one or more (and preferably all) of API characteristics data 4044, configuration data 4046, session data 4048, security data 4050 and information identifying other live or active proxy nodes within the cluster. As illustrated in FIG. 5, the synchronization of data states between proxy nodes results in a peer-to-peer synchronization configuration within proxy cluster 604—wherein each proxy 604a to 604d is a peer node within the peer-to-peer synchronization configuration.

In an embodiment of the invention, each proxy within a proxy cluster periodically carries out a heartbeat messaging procedure (i.e. a ping-pong message/response procedure) with all other proxy and updates its list of active peer nodes (i.e. the information identifying other live or active proxy nodes) depending on whether the heartbeat messaging procedure returns an error.

FIG. 7 illustrates a method of routing employed by proxies of the present invention, in implementing routing decisions (for example routing or load balancing decisions) involving client requests or messages received at said proxies.

Step 702 comprises receiving a client request or message at a proxy. Step 704 thereafter comprises parsing one or more data packets corresponding to the received client request or message, and extracting request or message parameter information. In an embodiment of the invention, parsing of the data packets may be implemented by a data packet parser within the proxy. The request or message parameter information extracted from parsed data packets in an embodiment comprise parameter information extracted from Layer 7 data within the received data packets.

In an embodiment of the invention, the parameter information extracted at step 704 may comprise at least one of a target API name and a hostname associated with the target API. The parser may optionally extract one or more of cookie information, communication protocols used or identified, HTTP methods or other protocol methods used or identified, and content type used or identified in the request/message.

Step 706 comprises using parameter information extracted at step 704 to identify an API characteristics data definition corresponding to the target API. In an embodiment of the invention, step 706 comprises searching through the API characteristics data definitions stored within API characteristics data 4044 of proxy 404 and identifying an API characteristics data definition that matches at least one of (and in a preferred embodiment both of) the target API name and the hostname extracted at step 704.

If no matching API characteristics data definition can be found, the client request is discarded or rejected, optionally with an appropriate error message being returned to the client.

If on the other hand, a matching API characteristics data definition can be found, step 708 comprises applying routing logic based at least on information within the matching API characteristics data definition.

In an embodiment of the invention, upon identification of a matching API characteristics data definition at step 706, the proxy may route the client message or request to a target API at an API server within the server backend, based on one or more of (i) IP address of API server and (ii) TCP port associated with said API server—as specified within the identified matching API characteristics data definition.

In an alternative embodiment of the invention, upon identification of a matching API characteristics data definition at step 706, the proxy may at step 708 implement a preliminary authentication step involving comparison between (i) request or message parameter information extracted at step 704 against (ii) corresponding parameter information specified within the matching API characteristics data definition identified at step 706. Only if the compared parameter information matches, would the proxy route the client message or request to a target API at an API server within the server backend—which routing would be based on one or more of (i) IP address of API server and (ii) TCP port associated with said API server—as specified within the matching API characteristics data definition. If on the other hand the compared parameter information does not match, the proxy may discard or reject the client request or message, and optionally return an error message to the client.

In the above embodiment, the preliminary authentication based on a comparison of parameter information at step 708 may involve a comparison between one or more of (i) cookie information, communication protocols, HTTP methods or other protocol methods and/or requested content type identified based on data packets associated with the client message or request and (ii) corresponding cookie information requirements, permitted communication protocols, permitted HTTP methods or other protocol methods and/or supported content type specified in the matching API characteristics definition file identified at step 706.

In another embodiment, the preliminary authentication at step 708 may additionally include ascertaining whether the client request or message complies with request rate limits and/or other firewall conditions specified within the matching API characteristics definition file identified at step 706. Only when the client request or message satisfies the authentication conditions specified for the preliminary authentication step, can the proxy proceed to route the client request or message to a target API at an API server within the server backend.

In an embodiment of the invention, if a matching API characteristics data definition identified at step 706 identifies multiple implemented instances of the target API (for example, multiple instances of the target API implemented either within a single API server or across multiple servers), step 708 may involve a preliminary step of selecting one of these multiple instances of the target API—based on one or more predefined routing or load balancing policies or techniques. The proxy may thereafter route the client message or request to the selected instance of the target API based on one or more of (i) IP address of API server and (ii) TCP port associated with said API server—as specified for the selected instance of the target API, within the matching API characteristics data definition. In an embodiment of the information, the routing or load balancing policies and/or techniques may be retrieved from configuration data 4046 associated with proxy 404.

It would be understood that in the various embodiments of step 708 discussed above, in implementing onward transmission of received client requests or messages to one or more servers, in addition to information within the matching API characteristics data definition identified at step 706, proxy 404 may rely on any one or more of configuration data 4046, session data 4048 and security data 4050 that is associated with and accessible to said proxy 404.

Figure 8A:
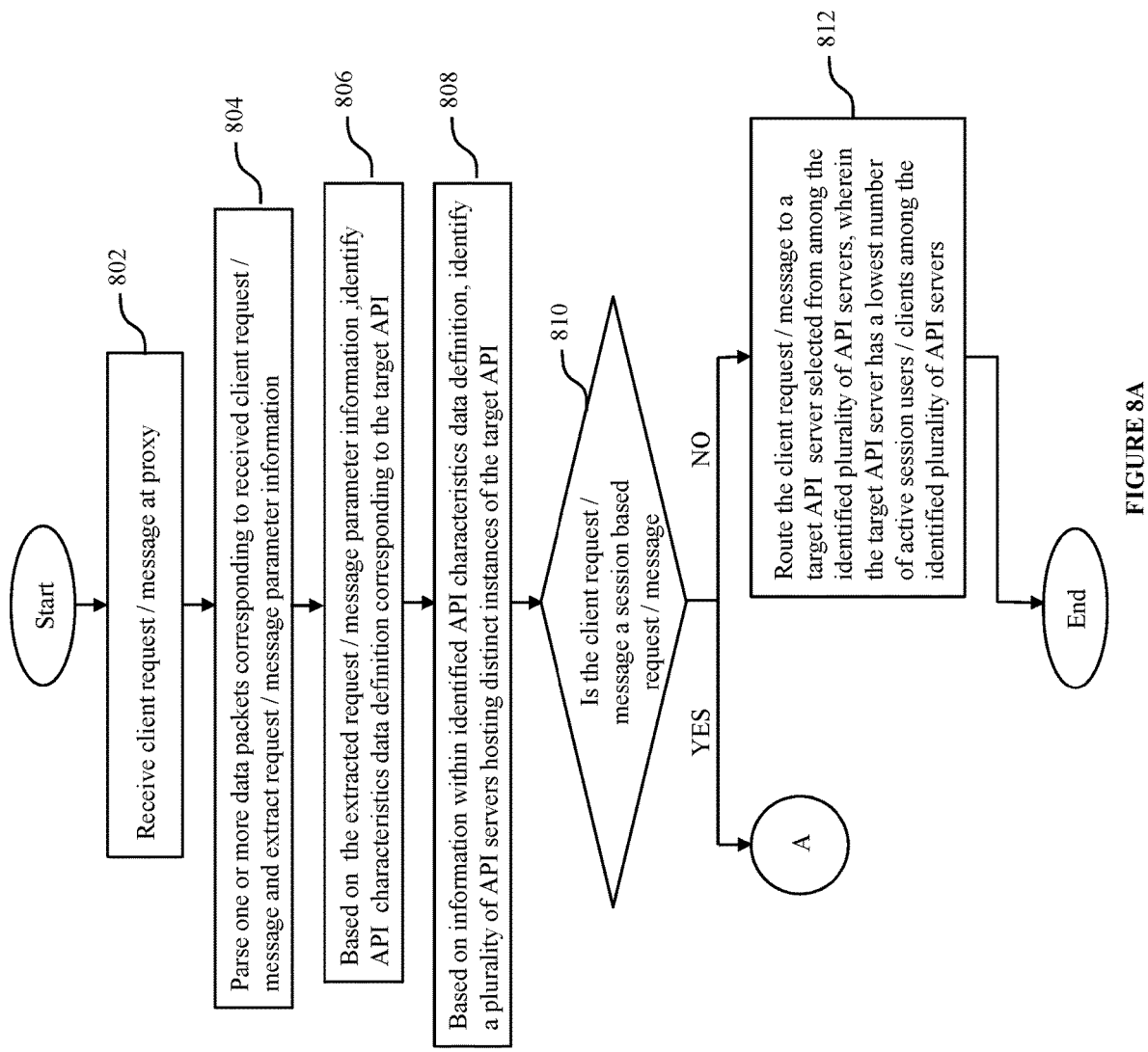
Figure 8B:
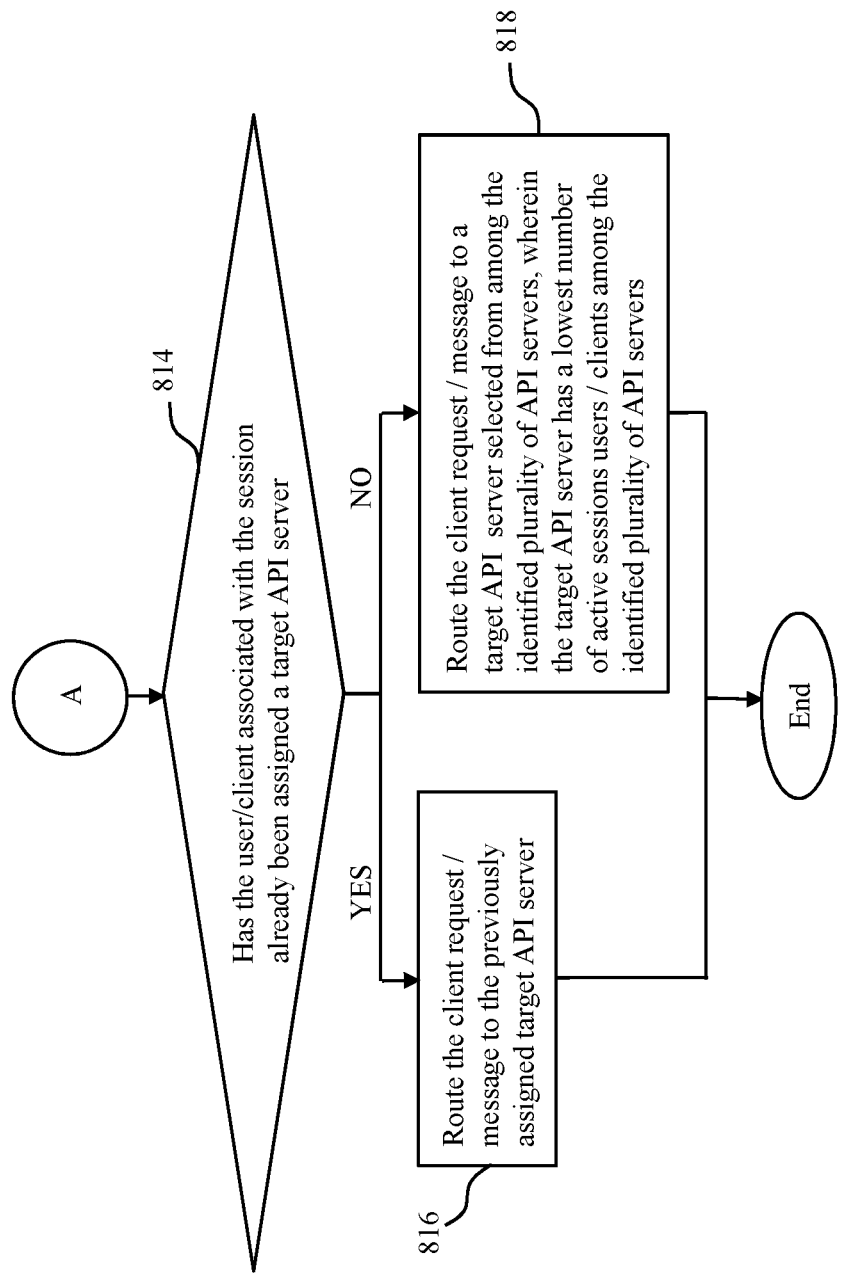

FIGS. 8A and 8B illustrate an exemplary load balancing policy for implementing load balancing among multiple instances of a target API.

Step 802 to 806 of FIG. 8 correspond to steps 702 to 706 of FIG. 7. Briefly, step 802 comprises receiving a client request or message at a proxy (for example proxy 404). Step 804 comprises parsing one or more data packets corresponding to the received client request or message and extracting request or message parameter information from the parsed data. The parameter information extracted at step 804 may comprise at least one of a target API name, and a hostname associated with the target API. The parser may optionally extract one or more of cookie information, communication protocols used or identified, HTTP methods or other protocol methods used or identified, and content type used or identified in the request/message.

Step 806 comprises using parameter information extracted at step 804 to identify an API characteristics data definition corresponding to the target API. In an embodiment of the invention, step 806 comprises searching through the API characteristics data definitions stored within API characteristics data 4044 of proxy 404 and identifying an API characteristics data definition that matches at least one of (and in a preferred embodiment both of) the target API name and the hostname extracted at step 804.

Step 808 comprises identifying a set of API servers that are hosting distinct instances of the target API—which identification may be made based on the information within the matching API characteristics data definition identified at step 806 (for example based on the IP address information of each API server hosting a distinct instance of the target API, and the corresponding TCP port associated with each such instance of the target API).

Step 810 thereafter involves ascertaining whether the client request or message is a session based request or message. In an embodiment of the invention, this determination may be made based on one or more of cookie information within the client request or message, and session information within session data 4048 associated with proxy 404.

For the purposes of this invention, session based requests or messages may be understood as client requests or messages that are made subsequent to authorization or identification of a user or client based on a unique id and/or one or more verification tokens (including standard tokens or custom tokens) or passwords. In contrast, non-session based requests or messages may be understood as client requests or messages where the user or client has not been identified.

In the event of a determination (at step 810) that the client request or message is a non-session based request or message, step 812 comprises routing the client request or message to a target API server selected from among the set of API servers identified at step 808, such that the selected target API server has a lowest number of session users or clients among the identified set of API servers. In the event it is determined there is more than one API server (among the set of API servers identified at step 808) which qualify as having the lowest number of session users or clients, successive non-session based client requests or messages are distributed among such API servers having the lowest number of session users or clients, in accordance with any load balancing method or technique, including for example round-robin allocation, location based allocation, server weightage based allocation etc.

Alternatively, in the event of a determination (at step 810) that the client request or message is a session based request or message, step 814 comprises ascertaining whether the user or client associated with the session has already been assigned a target API server. If yes, then step 816 comprises routing the client request or message to the target API server previously assigned to the client or user. If no, then step 818 comprises routing the client request or message to a target API server selected from among the set of API servers identified at step 808, such that the selected target API server has a lowest number of session users or clients among the identified set of API servers. In the event it is determined there are more than one API servers (among the set of API servers identified at step 808) which qualify as having the lowest number of session users or clients, the session based client request or message is allocated to one of such API servers.

In an embodiment of the invention, proxy 404 may be configured so as to implement (i) a control plane comprising a processor implemented control process, and (ii) one or more data planes, each data plane comprising a discrete processor implemented balancer process.

The control plane or control process may be configured for one or more of:

Receiving a new API characteristics data definition corresponding to each new API for which proxy 404 is configured to route client requests or messages. In an embodiment, each new API characteristics data definition may be received through a command line interpreter (CLI) or a RESTful API (REST API).

Validating each received new API characteristics data definition based on a prescribed API characteristics data definition schema and/or one or more validation rules.

Persisting validated API characteristics data definitions in a repository associated with or accessible by a proxy.

Synchronizing repositories associated or accessible by each proxy in a proxy cluster so that all proxies within the proxy cluster have access to validated and persisted API characteristics data definitions.

Monitoring cookies and other session data at each proxy within the proxy cluster and synchronizing all proxies within the cluster to share cookie data and other session data.

Monitoring health of each data plane and raising alerts in case a balancer process associated with a data plane crashes or is rendered inoperative.

Each data plane or balancer process may be configured for one or more of:

Comparing data parsed from data packets associated with a client request or message, with data in API characteristics data definitions, and identifying an API characteristics data definition corresponding to a target API.

Implementing routing or load balancing decisions based on contents of an identified API characteristics data definition that corresponds to a target API.

Implementing authentication steps involving comparison between (i) request or message parameter information (for example information extracted at step 704) against (ii) corresponding parameter information specified within the matching API characteristics data definition (for example as identified at step 706) and rejecting client requests or messages that fail one or more authentication steps.

Implementing two-stage rate limiting protection for API servers comprising (i) front end rate limiting—comprising blocking client messages or requests associated with an IP address that has exceeded a predefined threshold for API accesses per unit time, combined with (ii) back end rate limiting—comprising proxy node based limiting of delivery of client messages to an API, API server or API server cluster that has exceeded a predefined number of client messages or requests that said API, AI server or API server cluster can process simultaneously. The front end rate limiting may in an embodiment be implemented on an individual proxy node basis, based on information regarding the number of client messages received at the individual proxy node from a specific IP address. The back end rate limiting may in an embodiment be implemented based on a proxy-cluster wide basis, based on information aggregated (through synchronization of proxy nodes) from all nodes regarding the total number of client messages or requests being processed by an API, API server or API server cluster.

Checking cookies and other session data, and implementing load balancing decisions based on such cookies and/or session data.

By implementing separate and independent processes for the control plane and the one or more data planes, the invention improves high availability as well as scalability. Additionally, the separation of control and data planes improves security of the system, by enabling the control plane to continue to operate in isolation despite security attacks on one or more data planes.

Additionally in an embodiment of the invention, proxy 404 may be configured to implement asynchronous message based inter process communication (IPC) between the control plane and each data plane. As a consequence of the plurality of data planes, this enables proxy 404 to operate asynchronously—for the reason that while a proxy waits for a response from any target API or API server hosting a target API, it can move on to execution of a next process or can communicate with another target API or with an API server hosting another target API.

In an embodiment of the invention, proxy 404 (or each proxy within a proxy cluster) may be configured to initialize a new data plane (i.e. a new balancer process) for each additional protocol (e.g. HTTP, HTTPS, Web Socket, MQTT or CoAP) or TCP port supported by the proxy. A proxy 404 (or each proxy within a proxy cluster) may further be configured to initialize a plurality of sub-processes associated with each data plane. The plurality of sub-processes enables a proxy to receive and simultaneously handle a larger number of client requests or messages, and improves utilization of underlying device resources (e.g. processor capacity, I/O and memory)—thereby improving high availability as well as scalability.

In an embodiment of the invention, proxy 404 may additionally be provisioned with a REST API configured to enable queuing of requests to a particular API server, until the API server becomes available. Requests for a particular API server may be queued at proxy 404 and only forwarded to the API server when its availability is confirmed (for example by pinging the server until a response is received from the server). Such queuing at proxy 404 further enables asynchronous communication between the proxy and clients.

It would be understood that in prior art solutions, addition of each new API or each new API server would necessitate a corresponding modification of routing and/or load balancing policies within a router or load balancer to ensure that the new API or API server is accounted for in subsequent routing or load balancing routing decisions. In contrast, per the present invention, for each new API added to a server backend, an operator or system administrator simply needs to add a templatized new API characteristics data definition or modify an existing API characteristics data definition to specify the properties of the new API or API server—which is sufficient to ensure that the new API or API server is accounted for in subsequent routing or load balancing decisions. The addition of a new API characteristics data definition or modification of an existing API characteristics data definition may be implemented through a RESTful (REST) API. Additionally, the ability of API characteristics data definitions to identify multiple implemented instances of a target API enables the invention to respond to failure of an API server (i.e. a virtual server or linux container) implementing an instance of a target API. Specifically, in response to failure of one of a plurality of API servers identified within an API characteristics data definition, client requests or messages addressed to the target API may be transmitted to one of the remaining operational API servers identified within the API characteristics data definition. Once the failed API server is brought back online (or into an operational state), transmission of client requests or messages for the target API may resume to such API server. By ensuring that each proxy 404 stores session information corresponding to active client sessions, the invention ensures that client sessions being served by a first API server may be routed to a second API server without loss of session information or having to reinitialize the client session.

Yet further, the invention provides novel and inventive methods for handling various types of APIs such as Request/Response REST APIs, Streaming APIs that use Web Socket, and Publish/Subscribe APIs that use MQTT for text data or binary data such as array buffer or blob, with encryption (e.g. using SSL/TLS) or without encryption.

Figure 9:
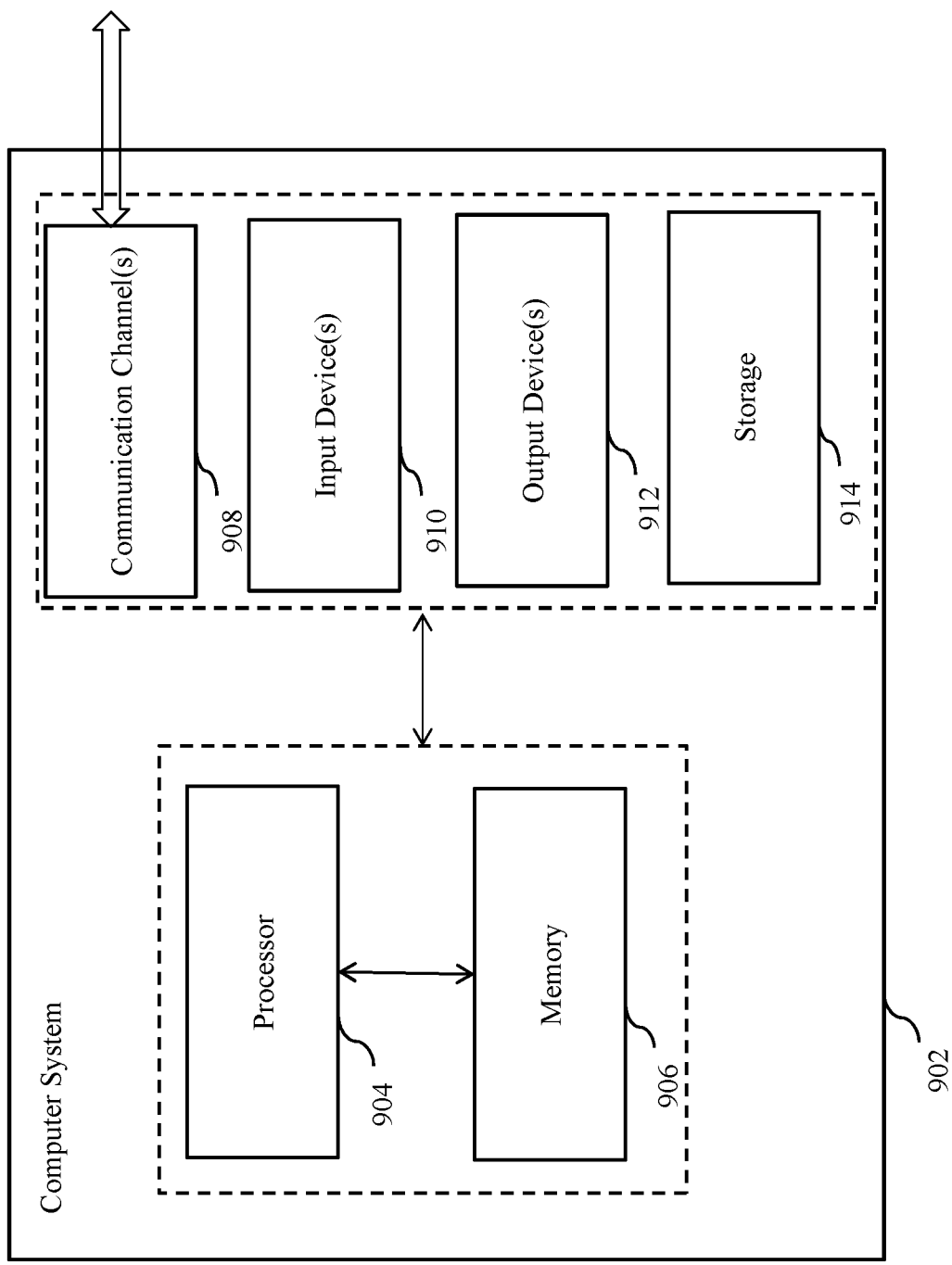
FIG. 9 illustrates an exemplary system in accordance with the present invention.

FIG. 9 illustrates an exemplary system in which various embodiments of the invention, including one or more proxies within a proxy cluster, may be implemented.

The system 902 comprises at-least one processor 904 and at-least one memory 906. The processor 904 executes program instructions and may be a real processor. The processor 904 may also be a virtual processor. The computer system 902 is not intended to suggest any limitation as to scope of use or functionality of described embodiments. For example, the computer system 902 may include, but not limited to, one or more of a general-purpose computer, a programmed microprocessor, a micro-controller, an integrated circuit, and other devices or arrangements of devices that are capable of implementing the steps that constitute the method of the present invention. In an embodiment of the present invention, the memory 906 may store software for implementing various embodiments of the present invention. The computer system 902 may have additional components. For example, the computer system 902 includes one or more communication channels 908, one or more input devices 910, one or more output devices 912, and storage 914. An interconnection mechanism (not shown) such as a bus, controller, or network, interconnects the components of the computer system 902. In various embodiments of the present invention, operating system software (not shown) provides an operating environment for various softwares executing in the computer system 902, and manages different functionalities of the components of the computer system 902.

The communication channel(s) 908 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, bluetooth or other transmission media.

The input device(s) 910 may include, but not limited to, a touch screen, a keyboard, mouse, pen, joystick, trackball, a voice device, a scanning device, or any another device that is capable of providing input to the computer system 902. In an embodiment of the present invention, the input device(s) 910 may be a sound card or similar device that accepts audio input in analog or digital form. The output device(s) 912 may include, but not limited to, a user interface on CRT or LCD, printer, speaker, CD/DVD writer, or any other device that provides output from the computer system 902.

The storage 914 may include, but not limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 902. In various embodiments of the present invention, the storage 914 contains program instructions for implementing the described embodiments.

While not illustrated in FIG. 9, the system of FIG. 9 may further include some or all of the components of a proxy of the type more fully described in connection with FIG. 4 hereinabove.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 902. The method described herein is typically implemented as a computer program product, comprising a set of program instructions which is executed by the computer system 902 or any other similar device. The set of program instructions may be a series of computer readable codes stored on a tangible medium, such as a computer readable storage medium (storage 914), for example, diskette, CD-ROM, ROM, flash drives or hard disk, or transmittable to the computer system 902, via a modem or other interface device, over either a tangible medium, including but not limited to optical or analogue communications channel(s) 908. The implementation of the invention as a computer program product may be in an intangible form using wireless techniques, including but not limited to microwave, infrared, bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

The invention claimed is:

1. A proxy configured for routing messages to a plurality of Application Programming Interfaces (APIs), the proxy comprising:
 a memory configured to store a plurality of API characteristics data definitions, each API characteristics data definition from the plurality of API characteristics data definitions being a data file that is uniquely associated with an API from the plurality of APIs; and
 a processor operatively coupled to the memory, the processor configured to:
  extract, from a message received from a client device, parameter information including a name of a target API from the plurality of APIs;
  select, from among the plurality of API characteristics data definitions, an API characteristics data definition that includes the name of the target API;
  compare the parameter information extracted from the message and information contained within the API characteristics data definition to determine whether the parameter information matches the information contained within the API characteristics data definition;

identify, in response to the parameter information matching the information contained within the API characteristics data definition, a plurality of API servers each hosting a different instance of the target API;

select an instance of the target API hosted on an API server from the plurality of API servers by:

in response to determining that the message is a non-session based message based on session data stored in the memory, selecting the instance of the target API hosted on the API server having a number of session users lower than a number of session users for each remaining API server from the plurality of API servers, and in response to determining that the message is a session based message based on the session data:

in response to determining that the client device has been assigned to the API server, selecting the instance of the target API hosted on the API server; and in response to determining that the client device has not been assigned to the API server, selecting the instance of the target API hosted on the API server having the number of session users lower than a number of session users for each remaining API server from the plurality of API servers; and transmit the message to the instance of the target API.

2. The proxy as claimed in claim 1, wherein the parameter information includes one or more of cookie information, token information, communication protocol information, protocol method information, and content type.

3. The proxy as claimed in claim 1, wherein:

the processor is configured to identify the plurality of API servers based on a plurality of IP addresses and a plurality of TCP ports included within the API characteristics data definition, the processor is configured to select the instance of the target API by selecting an IP address from the plurality of IP addresses and a TCP port from the plurality of TCP ports.

4. The proxy as claimed in claim 3, wherein the processor is configured to transmit the message to the instance of the target API based at least on the IP address and the TCP port.

5. The proxy as claimed in claim 1, wherein the processor is configured to implement (i) a control plane including a processor implemented control process associated with configuring and synchronizing the plurality of API characteristics data definitions, and (ii) one or more data planes, each data plane from the one or more data planes including a discrete processor implemented balancer process associated with routing the messages.

6. The proxy as claimed in claim 5, wherein the processor implementing the control plane is configured for one or more of:

(i) receiving a new API characteristics data definition,
(ii) validating the new API characteristics data definition based on at least one of a prescribed API characteristics data definition schema or one or more validation rules,
(iii) persisting the plurality of API characteristics data definitions, the plurality of API characteristics data definitions including one or more API characteristics data definitions that have been validated,
(iv) synchronizing the plurality of API characteristics data definitions with pluralities of API characteristics data definitions of a plurality of proxies so that each proxy from the plurality of proxies has access to the plurality of API characteristics data definitions,
(v) monitoring and synchronizing session data including cookies, or
(vi) monitoring the one or more data planes for a failure event.

7. The proxy as claimed in claim 5, wherein the processor implementing the one or more data planes is configured for one or more of:

(i) the selecting the API characteristics data definition including (a) comparing data parsed from the message with data in the plurality of API characteristics data definitions, and (b) identifying the API characteristics data definition uniquely associated with the target API,
(ii) implementing one or more routing or load balancing decisions based on the information identified from within the API characteristics data definition, the implementing including the identifying of the information from within the API characteristics data definition and the transmitting the message,
(iii) implementing authentication steps for authenticating the message,
(iv) implementing rate limiting based security for one or more API servers, or
(v) implementing one or more load balancing decisions based on cookies or session data.

8. The proxy as claimed in claim 5, wherein the processor is configured to implement asynchronous message based inter process communication (IPC) between the control plane and each data plane from the one or more data planes.

9. The proxy as claimed in claim 5, wherein at least one data plane from the one or more data planes is an asynchronous data plane.

10. The proxy as claimed in claim 5, wherein the one or more data planes includes a discrete data plane uniquely associated with each protocol supported by the proxy or each TCP port supported by the proxy.

11. The proxy as claimed in claim 5, wherein at least one data plane from the one or more data planes is associated with a plurality of sub-processes, the processor configured to initialize the plurality of sub-processes to simultaneously handle routing of the messages.

12. The proxy as claimed in claim 1, wherein the processor is further configured to authenticate the message based on security data stored in the memory, the security data including one or more of a cipher suite, a digital certificate, a session key, and an asymmetric or symmetric cipher, the processor configured to transmit the message after authenticating the message.

13. A proxy configured for routing messages to a plurality of APIs, the proxy configured to be included in a proxy cluster including a plurality of proxies, the proxy including:

a memory configured to store a plurality of API characteristics data definitions, each API characteristics data definition from the plurality of API characteristics data definitions being a data file that is uniquely associated with an API from the plurality of APIs; and a processor operatively coupled to the memory, the processor configured to:

extract, from a message received from a client device, parameter information including a name of a target API from the plurality of APIs and a hostname associated with the target API;

select, from among the plurality of API characteristics data definitions, an API characteristics data definition based on the name of the target API and the hostname, the API characteristics data definition uniquely associated with the target API and including a plurality of IP addresses, each IP address from the plurality of IP addresses being associated with a different API server from a plurality of API servers, each API server from the plurality of API servers hosting a different instance of the target API;

compare the parameter information extracted from the message and information contained within the API characteristics data definition to determine whether the parameter information matches the information contained within the API characteristics data definition;

identify, in response to the parameter information matching the information contained within the API characteristics data definition, the plurality of API servers based on the plurality of IP addresses;

select an instance of the target API hosted on an API server from the plurality of API servers by:
  in response to determining that the message is a non-session based message based on session data stored in the memory, selecting the instance of the target API hosted on the API server having a number of session users lower than a number of session users for each remaining API server from the plurality of API servers, and
  in response to determining that the message is a session based message based on the session data:
    in response to determining that the client device has been assigned to the API server, selecting the instance of the target API hosted on the API server; and
    in response to determining that the client device has not been assigned to the API server, selecting the instance of the target API hosted on the API server having the number of session users lower than a number of session users for each remaining API server from the plurality of API servers; and
  transmit the message to the instance of the target API.

14. The proxy as claimed in claim 13, wherein the processor is further configured to synchronize a data state of the plurality of API characteristics data definitions accessible at the proxy with data states of pluralities of API characteristics data definitions accessible at remaining proxies from the plurality of proxies within the proxy cluster.

15. A method for routing client messages received at a proxy to a target API among a plurality of APIs implemented on a plurality of API servers, the method comprising:
  extracting, from a message received from a client device at the proxy, parameter information including a name of the target API;
  selecting, from among a plurality of API characteristics data definitions stored at the proxy, an API characteristics data definition that includes the name of the target API, each API characteristics data definition from the plurality of API characteristics data definitions being a data file that is uniquely associated with an API from the plurality of APIs;
  comparing the parameter information extracted from the message and information contained within the API characteristics data definition to determine whether the parameter information matches the information contained within the API characteristics data definition;
  identifying, in response to the parameter information matching the information contained within the API characteristics data definition, a plurality of API servers each hosting a different instance of the target API;
  selecting an instance of the target API hosted on an API server from the plurality of API servers by:
    in response to determining that the message is a non-session based message based on session data stored at the proxy, selecting the instance of the target API hosted on the API server having a number of session users lower than a number of session users for each remaining API server from the plurality of API servers, and
    in response to determining that the message is a session based message based on the session data:
      in response to determining that the client device has been assigned to the API server, selecting the instance of the target API hosted on the API server; and
      in response to determining that the client device has not been assigned to the API server, selecting the instance of the target API hosted on the API server having the number of session users lower than a number of session users for each remaining API server from the plurality of API servers; and
    transmitting the message to the instance of the target API.

16. The method as claimed in claim 15, wherein the parameter information includes one or more of cookie information, communication protocol information, protocol method information, and content type.

17. The method as claimed in claim 15, wherein:
  the identifying the plurality of API servers is based on a plurality of IP addresses and a plurality of TCP ports included within the API characteristics data definition, and
  the selecting the instance of the target API includes selecting an IP address from the plurality of IP addresses and a TCP port from the plurality of TCP ports.

18. The method as claimed in claim 17, wherein the transmitting the message to the instance of the target API is based at least on the IP address and the TCP port.

19. The method as claimed in claim 15, wherein
  the identifying the plurality of target API servers is based on a combination of transport protocol data and application protocol data.

20. The method as claimed in claim 15, wherein
  the identifying the plurality of target API servers is based on TCP data extracted from the message.

21. A method for routing client messages received at a proxy to an instance of a target API among a plurality of instances of the target API, the method comprising:
  extracting, from a message received from a client device at the proxy, parameter information including a name of the target API and a hostname associated with the target API;
  selecting, from among a plurality of API characteristics data definitions stored at the proxy, an API characteristics data definition based on the name of the target API and the hostname, the API characteristics data definition uniquely associated with the target API and including a plurality of IP addresses, each IP address from the plurality of IP addresses being associated with a different API server from a plurality of API servers;
  comparing the parameter information extracted from the message and information contained within the API characteristics data definition to determine whether the parameter information matches the information contained within the API characteristics data definition;

identifying, responsive to the parameter information matching the information contained within the API characteristics data definition, the plurality of API servers, each API server within the plurality of API servers hosting a different instance of the target API from the plurality of instances of the target API; and responsive to determining that the message is a non-session based message, selecting the instance of the target API from the plurality of instances of the target API and hosted on an API server from the plurality of API servers and having a number of session users lower than a number of session users for each remaining API server from the plurality of API servers; and responsive to determining that the message is a session based message:

responsive to determining that the client device has been assigned to an API server from the plurality of API servers, selecting the instance of the target API hosted on that API server; and responsive to determining that the client device has not been assigned to an API server from the plurality of API servers, selecting the instance of the target API hosted on the API server having the number of session users lower than a number of session users for each remaining API server from the plurality of API servers; and transmitting the message to the instance of the target API that is selected.

22. A computer program product for routing messages received at a proxy to a target API among a plurality of APIs implemented on one or more API servers, the computer program product comprising a non-transitory computer usable medium having a computer readable program code embodied therein, the computer readable program code comprising instructions for:

extracting, from message received from a client device at a client device, parameter information including a name of the target API;

selecting, from among a plurality of API characteristics data definitions stored at the proxy, an API characteristics data definition that includes the name of the target API, each API characteristics data definition from the plurality of API characteristics data definitions being a data file that is uniquely associated with an API from the plurality of APIs;

comparing the parameter information extracted from the message and information contained within the API characteristics data definition to determine whether the parameter information matches the information contained within the API characteristics data definition;

identifying, in response to the parameter information matching the information contained within the API characteristics data definition, a plurality of API servers each hosting a different instance of the target API;

selecting an instance of the target API hosted on an API server from the plurality of API servers by:

in response to determining that the message is a non-session based message based on session data stored at the proxy, selecting the instance of the target API hosted on the API server having a number of session users lower than a number of session users for each remaining API server from the plurality of API servers, and in response to determining that the message is a session based message based on the session data:

in response to determining that the client device has been assigned to the API server, selecting the instance of the target API hosted on the API server; and in response to determining that the client device has not been assigned to the API server, selecting the instance of the target API hosted on the API server having the number of session users lower than a number of session users for each remaining API server from the plurality of API servers; and transmitting the message to the instance of the target API.

\* \* \* \* \*